Oct. 6, 1931.   C. S. BRAGG ET AL   1,826,414
BRAKE MECHANISM FOR AUTOMOTIVE VEHICLES
Original Filed May 19, 1925   7 Sheets-Sheet 3
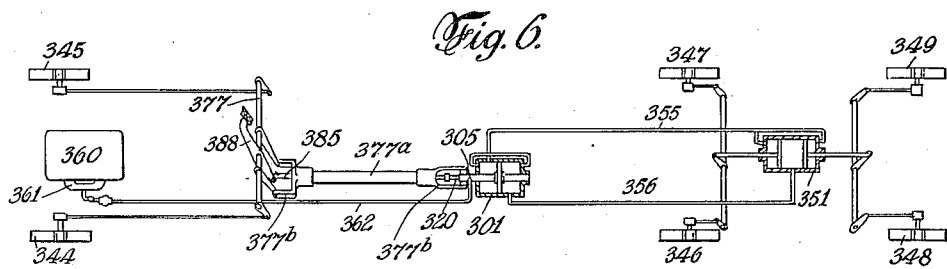
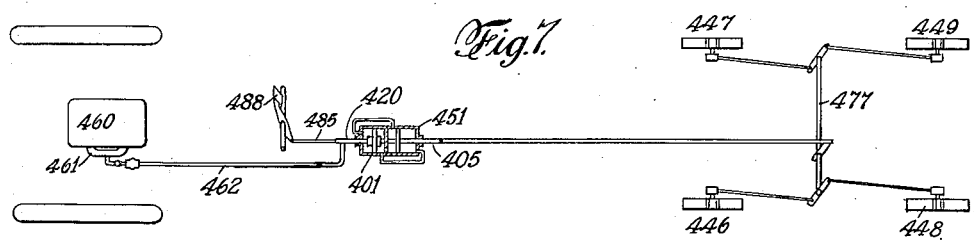
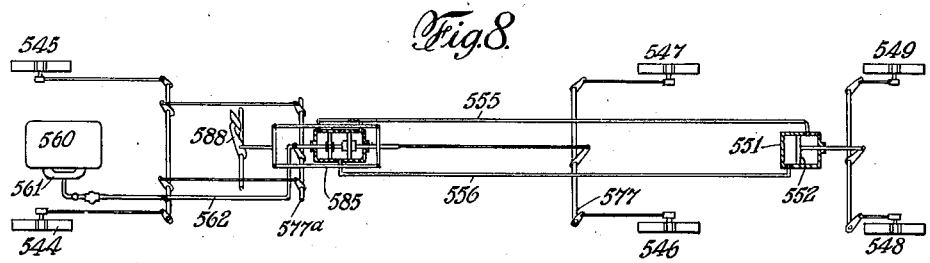

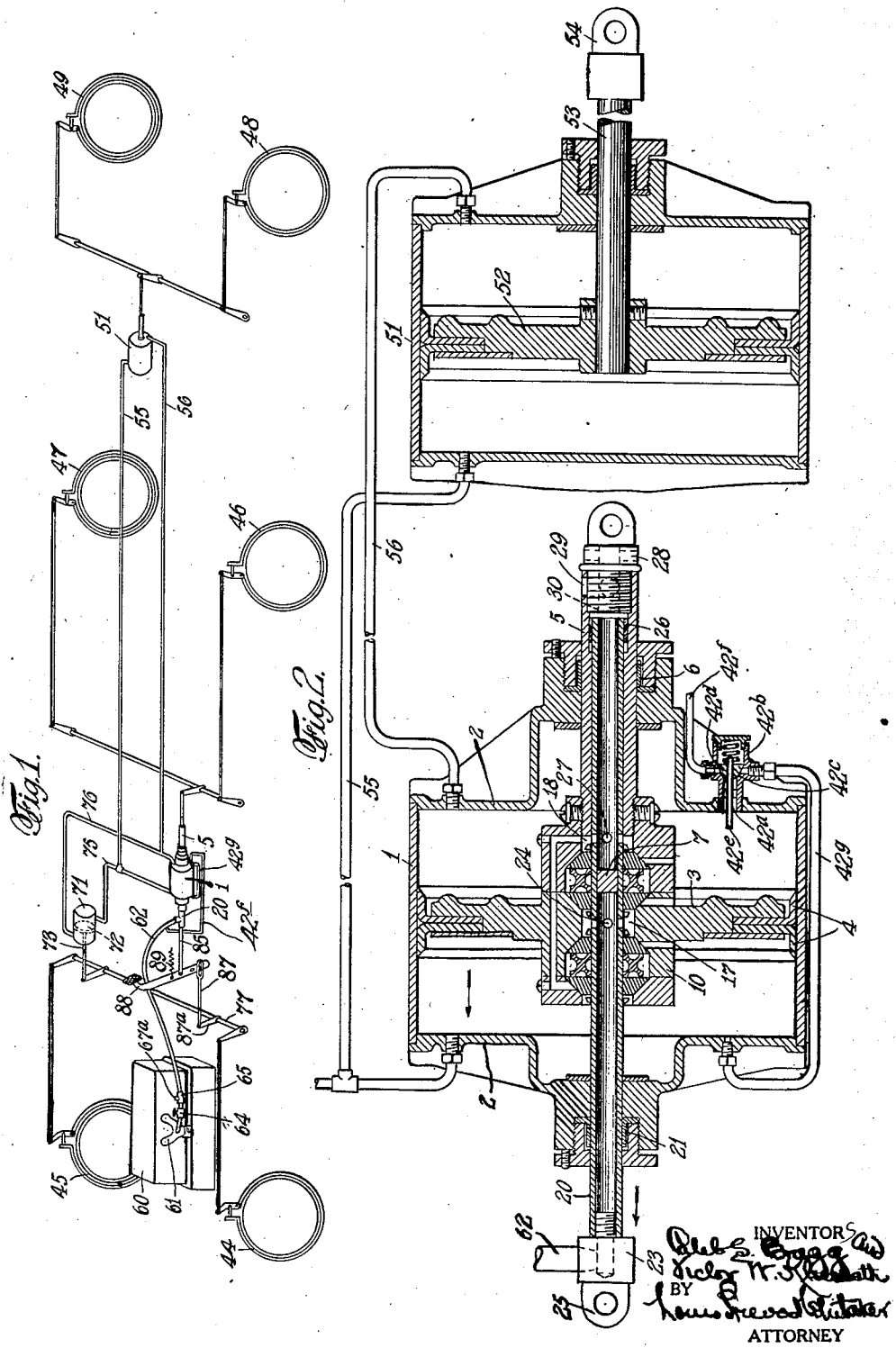

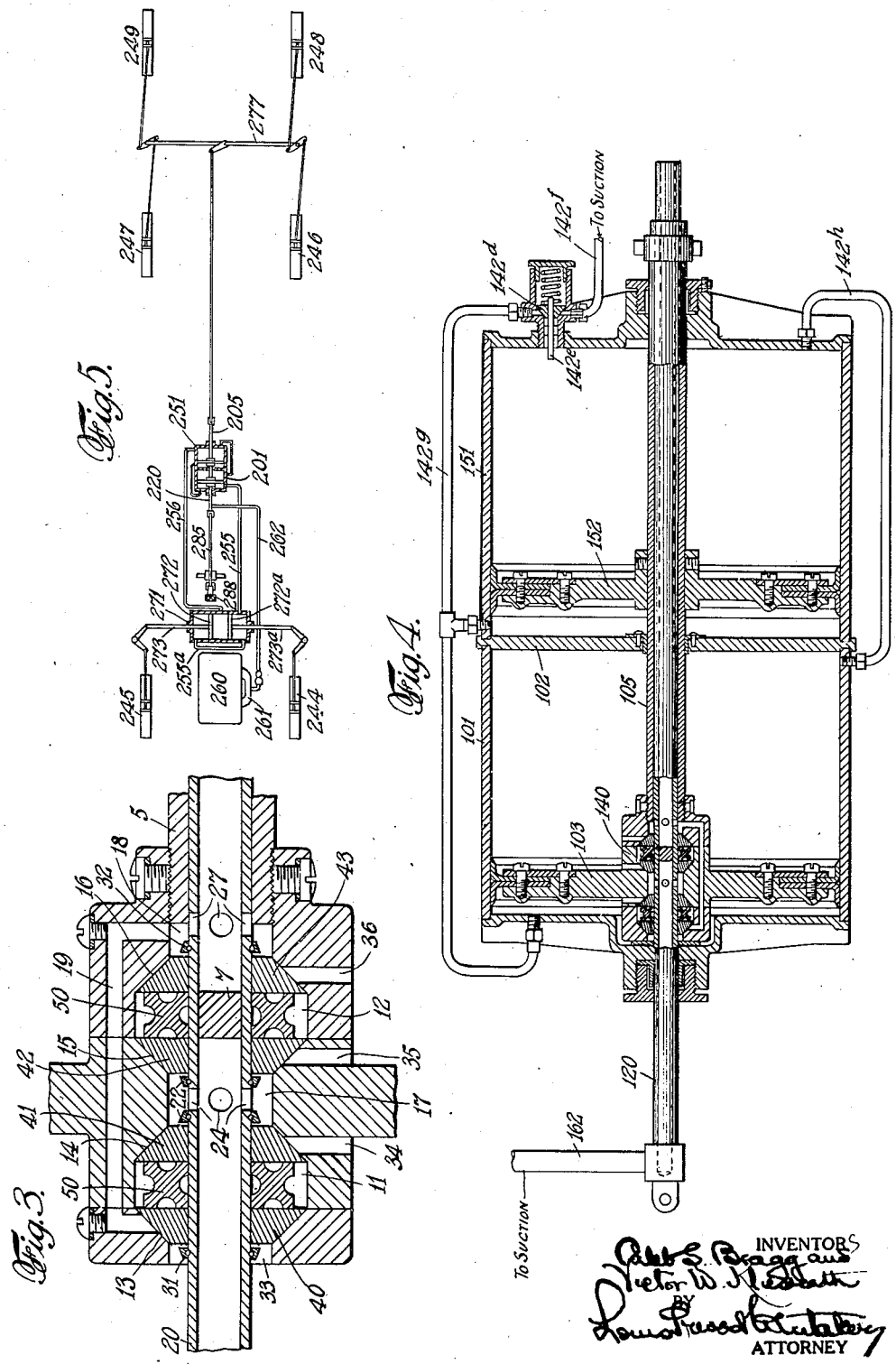

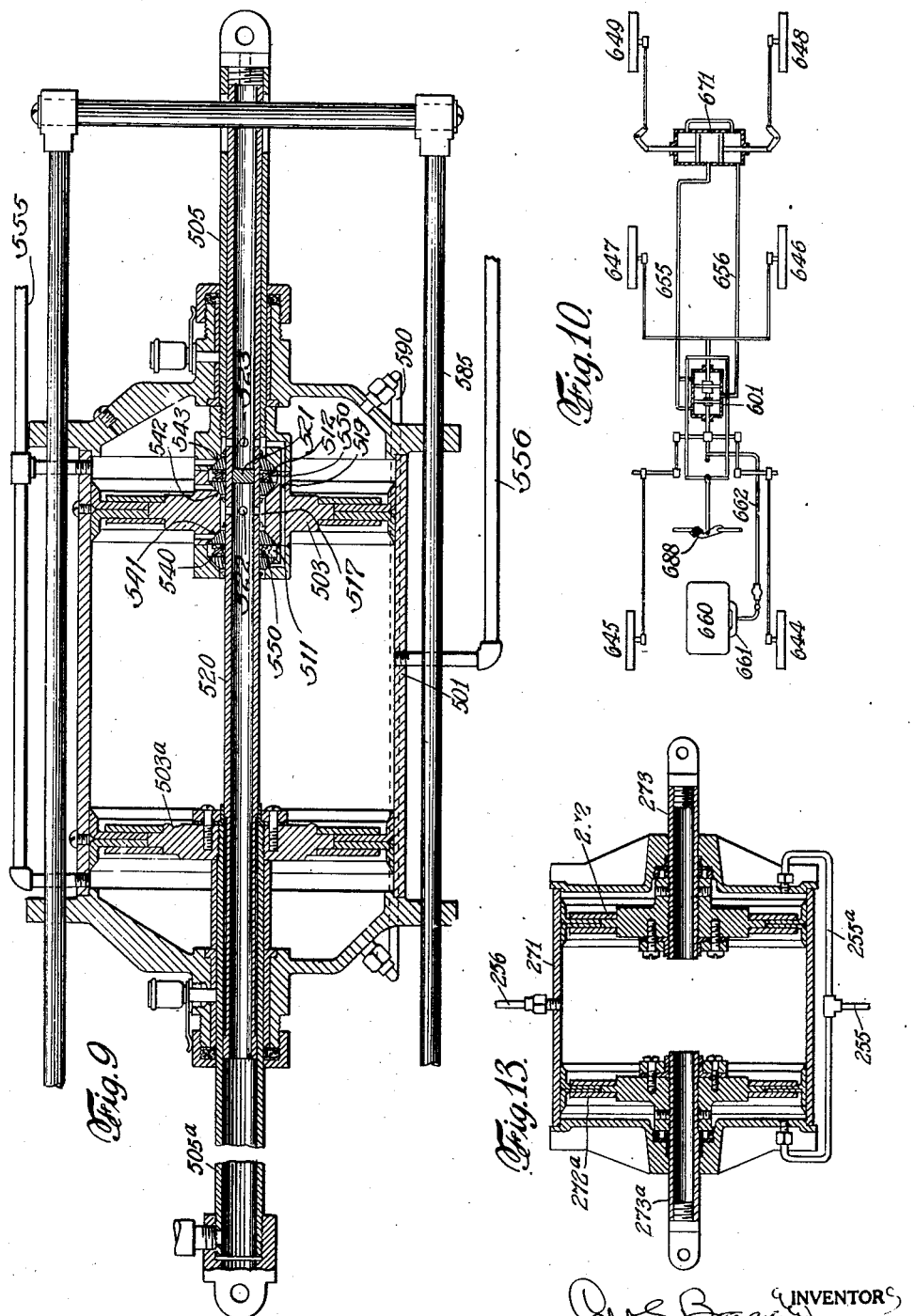

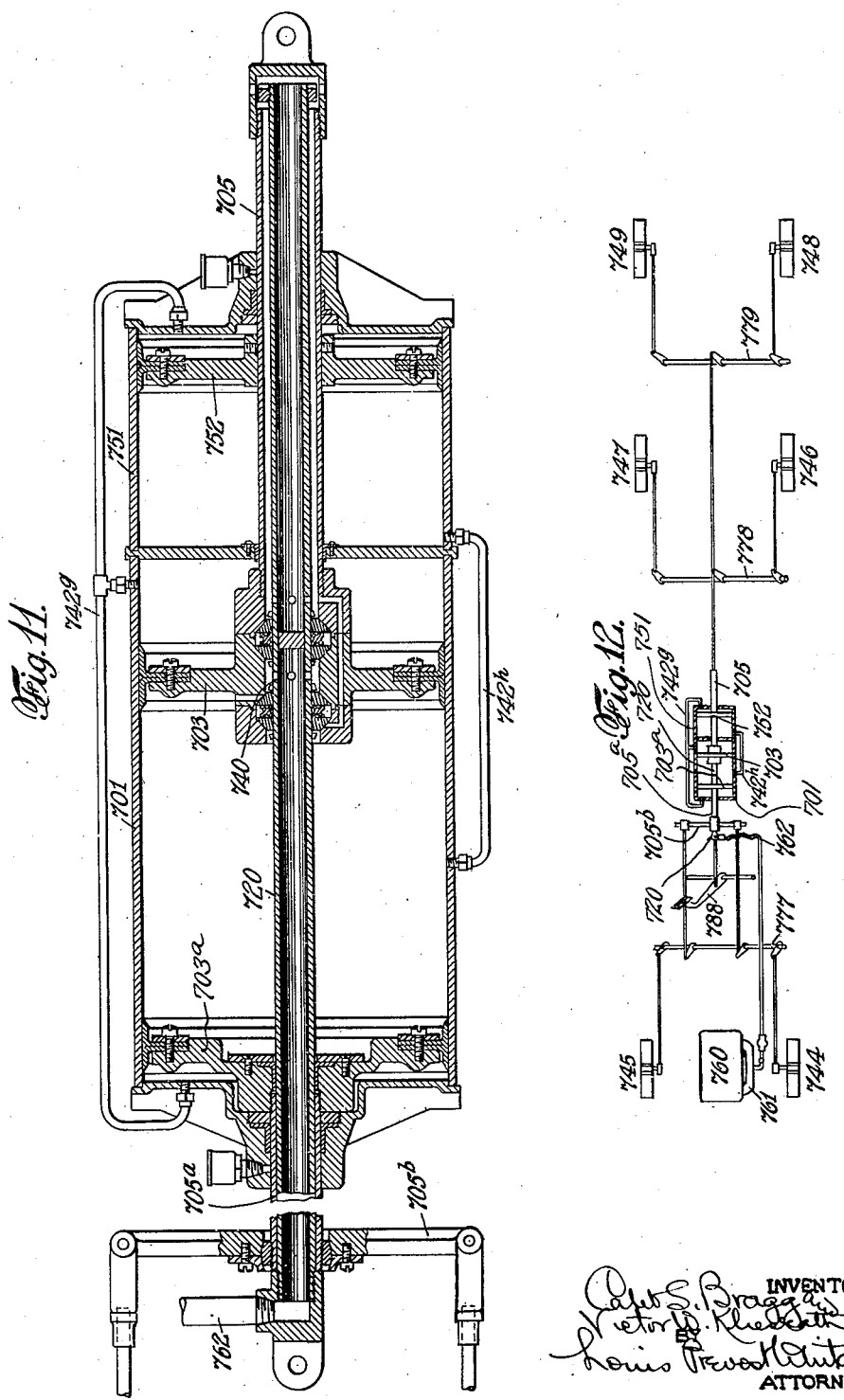

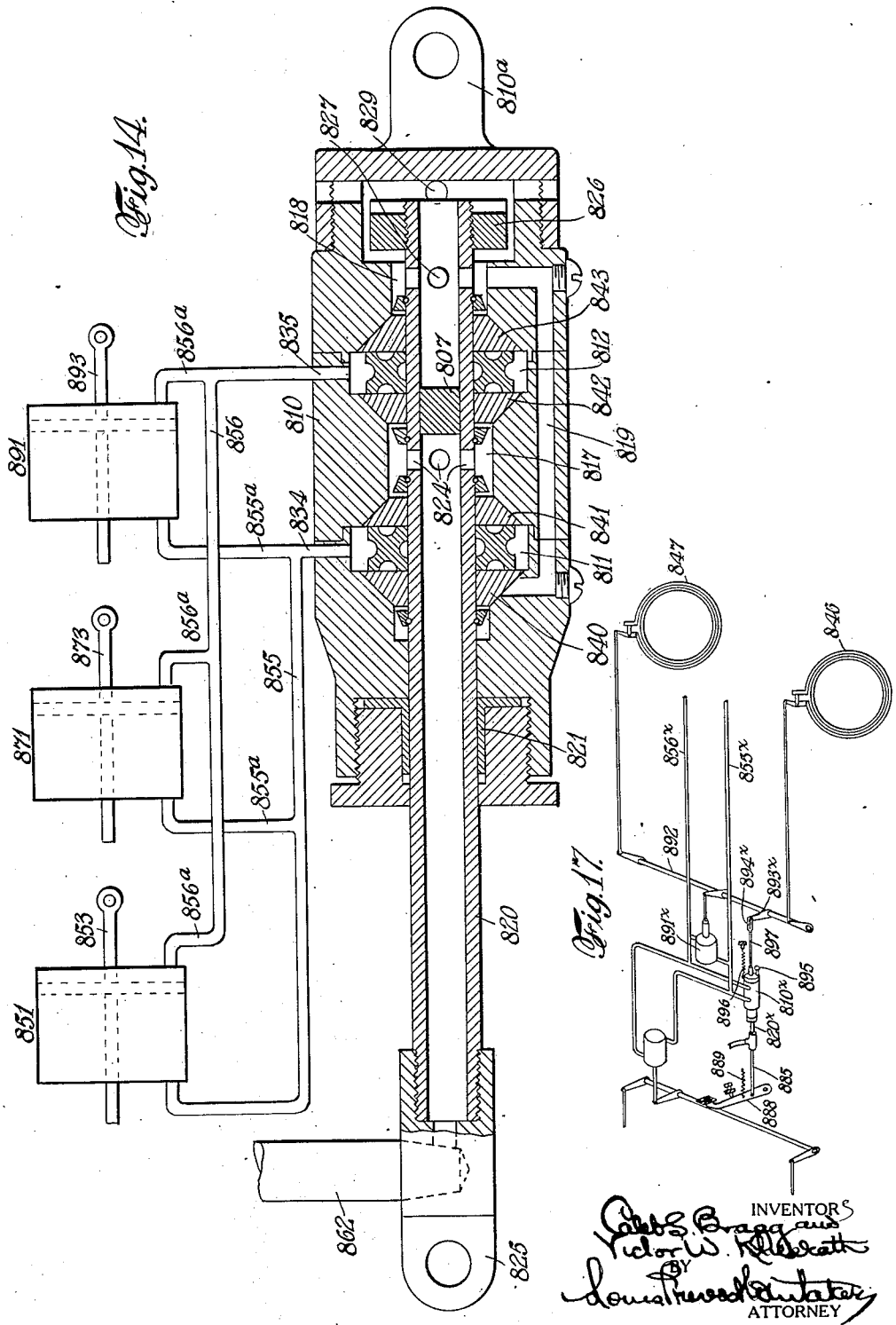

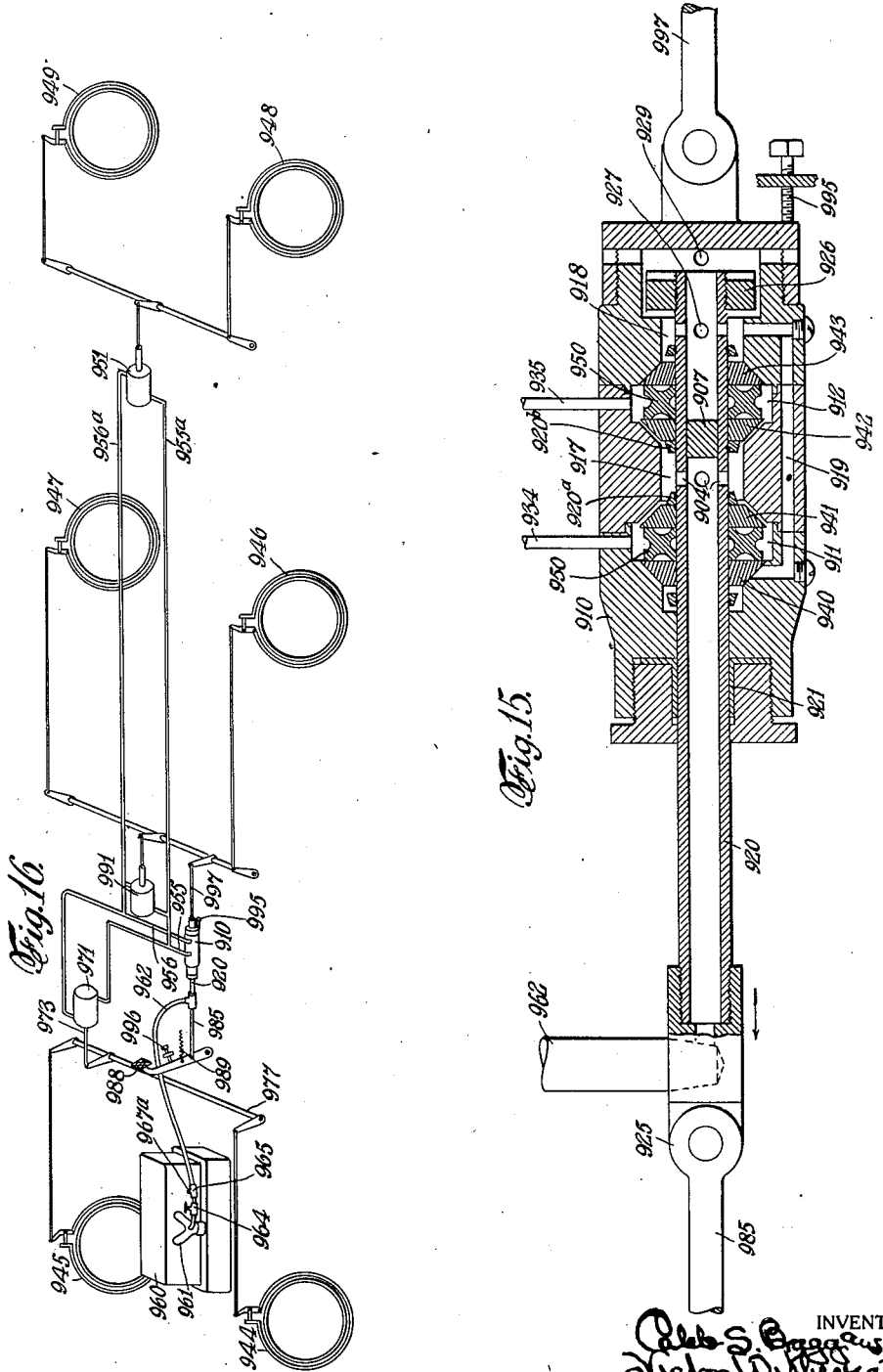

Patented Oct. 6, 1931

1,826,414

UNITED STATES PATENT OFFICE

CALEB S. BRAGG AND VICTOR W. KLIESRATH, OF LONG ISLAND CITY, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed May 19, 1925, Serial No. 31,281. Renewed March 6, 1931.

Our invention consists in the novel features hereinafter described, reference being had to the accompanying drawings, which illustrate several embodiments of the same selected by us for purposes of illustration, and the said invention is fully disclosed in the following description and claims.

Our invention is an improvement in power actuated brake mechanism for vehicles, and is specially adapted for use with automotive vehicles propelled by an internal combustion engine, which in its normal operation, provides continually differential pressures, which can be availed for operating the power actuators employed in connection with the brake mechanism of the vehicle. Our present invention is especially adapted for operating the brake mechanism of heavy automotive vehicles, such as trucks and buses, in which the power required to apply all of the brake mechanism for the vehicle, which may have four, six, or even more wheels, is beyond the ordinary physical strength of the operator, and our present invention is also readily adaptable to installations in which a main automotive vehicle is provided with a trailing vehicle, or trailer, propelled by the main vehicle, so that the brake mechanism of both vehicles shall be under the control of the operator of the main vehicle.

According to our present invention, we provide a plurality of power actuators, each comprising a cylinder and piston working therein, the said piston being connected to different brake mechanisms of the vehicle or vehicles, or to different groups of brake mechanisms of the vehicle or vehicles, the cylinders of said actuators being connected with a single controlling and reversing valve mechanism which may be exterior to and separate from the cylinders of all of the actuators, or it may be embodied in and form a part of one of the said actuators, the necessary pipe connections being provided in either case to insure the simultaneous operation of the several actuators of the brake mechanisms connected therewith, under the control of a single valve mechanism connected to an operator operated part, which is preferably the ordinary pedal lever. According to our invention, the valve operating mechanism is also connected with one or more of the brake mechanisms by means permitting lost motion, in such manner that should the power fail for any reason, the operator may nevertheless effect the application of the brakes connected with the valve actuating mechanism as soon as the lost motion is taken up, and can also add his physical force in the same manner to the brakes connected with the valve actuating mechanism even when the power is available and operating. In our preferred construction the controlling and reversing valve mechanism is embodied in a double acting piston of one of the actuators, which for convenience we designate the main actuator, said piston being adapted to be moved in either direction by differential pressures on opposite faces thereof and to be held stationary by establishing an equilibrium of pressures on opposite sides of the piston under the control of the valve mechanism, the other actuators being valveless but having their cylinders so connected with the cylinder of the main actuator as to be controlled and operated by the said valve mechanism thereof. In this preferred construction the valve mechanism is preferably operated by a valve actuating rod or sleeve connected with the foot lever or other operator operated part and connected to the piston of the main actuator by means permitting lost motion, whereby the operator may move the valve into position to vent the cylinder of the main actuator and may effect by his physical force the movement of the piston of the main actuator and the brake mechanism connected therewith, in addition to the power exerted thereon by the main actuator or to insure the application of the brake mechanism connected with said piston upon failure of power. It will be understood that, whereas in our preferred constructions, both the main and auxiliary pistons are double acting, the brake mechanisms connected therewith, will be positively applied and positively relieved, thus enabling a wide variety of brake mechanisms to be employed, some of which would not be available if the brake mechanisms were not positively relieved by the reversing movements of the piston, or pistons, connected therewith.

In the accompanying drawings, which illustrate a number of embodiments of our invention, selected by us for purposes of illustration, Fig. 1 is a diagrammatic view of an installation adapted especially for vehicles having six wheels and provided with brake mechanism for each of said wheels and embodying our present invention.

Fig. 2 is an enlarged sectional view illustrating one form of main power actuator and one form of auxiliary power actuator and illustrating the operative connections between them, portions of the piping being broken away.

Fig. 3 is an enlarged detail, sectional view of a form of poppet valve mechanism shown in connection with the main power actuator in Fig. 2.

Fig. 4 is a sectional view similar to Fig. 2 showing a modification in which a main power actuator and an auxiliary power actuator are structurally combined, the pistons of both actuators being connected with the same piston rod.

Fig. 5 is a diagrammatic view showing another installation, suitable for vehicles having six wheels and braking mechanism for each wheel, and illustrating a modification of our invention.

Fig. 6 is a similar view showing another modification.

Fig. 7 is a similar view showing another modified embodiment of our invention applicable to vehicles having six wheels, for braking four of the wheels thereof.

Fig. 8 is a similar view showing another modification of our invention, suitable for vehicles having six wheels.

Fig. 9 is an enlarged sectional view showing a modified form of main power actuator having two power pistons in the same cylinder under the control of a single reversing valve mechanism and representing the form of main power actuator indicated diagrammatically in Fig. 8.

Fig. 10 is another diagrammatic view illustrating another modified form of our invention, including a double piston main power actuator, such as illustrated in Fig. 9, in conjunction with double piston auxiliary power actuators, and adapted for use in connection with vehicles having six wheels.

Fig. 11 is an enlarged sectional view of a double piston main actuator similar to that shown in Fig. 9, having an auxiliary actuator cylinder and piston structurally combined therewith, the piston of the auxiliary actuator being connected with the same piston rod as the main piston of the main actuator.

Fig. 12 is a diagrammatic view illustrating the combined main and auxiliary actuators shown in Fig. 11, installed in connection with the brake mechanism of a six wheel vehicle.

Fig. 13 is an enlarged sectional view of a modified form of auxiliary actuator provided with two oppositely movable double acting pistons, each provided with a separate piston rod.

Fig. 14 is an enlarged view of a valve mechanism independent of any actuator structure, showing it connected with a plurality of valveless actuators for simultaneously controlling the same, the valve mechanism being arranged to be connected in the linkage between the pedal lever and certain brake mechanism.

Fig. 15 is a view similar to Fig. 14, showing a slightly modified form of valve mechanism independent of the actuator structure, for maintaining a partial vacuum on both faces of the piston of each actuator connected therewith, when the valve mechanism is in its normal or "off" position.

Fig. 16 is a diagrammatic view showing an installation in a six wheel vehicle, including a plurality of valveless actuators and the independent controlling valve mechanism illustrated in Fig. 15, for example.

Fig. 17 is a detail view showing a slightly modified form of installation, including a valve mechanism like that shown in Fig. 14.

In carrying out our invention, we prefer to employ as the main power actuator, the apparatus illustrated at the left in Fig. 2, the same being a form of power actuator invented by us, the specific construction of which is covered by our former application for Letters Patent of the United States filed January 5, 1925, Serial No. 506, but other forms of main actuator may be employed in carrying out our present invention. In order that our invention may be understood, we will briefly describe the construction and operation of the main actuator. As shown in Fig. 2, the main actuator comprises a cylinder, 1, provided with heads, 2, 2, and enclosing a double acting piston, 3, provided with gaskets, 4, provided with a hollow piston rod, 5, extending through a stuffing box, 6, in one end of the cylinder and having its inner end attached to the hub of the piston. The hub, 10, of the piston is provided with reversing valve mechanism illustrated on an enlarged scale in Fig. 3. The piston hub is provided with two valve chambers, 11 and 12, respectively, each of which is provided with two valve seats, said valve seats being coaxial with the piston, and being indicated at 13, 14, and 15, 16, respectively. The piston hub is provided with a chamber, 17, which in this instance is an outlet or suction chamber, and which communicates with each of the valve chambers, 11, 12, through the openings within the valve seats, 14—15. The piston is also provided with a chamber, 18, in this instance communicating with the atmosphere and termed the higher pressure chamber, and which communicates with the valve seat, 16, and by lateral passage, 19, with the valve seat, 13, at the opposite end of the piston hub. 20 represents the valve actuating part, consisting in this instance of a valve sleeve passing through a stuffing box, 21, in the cylinder head at the opposite end of the cylinder from the stuffing box, 6, said sleeve also extending longitudinally through the piston hub, the chambers thereof and valve seats thereof, and through the hollow piston rod, 5, and being movable longitudinally with respect to the piston, to effect the operation of the reversing valves. The valve sleeve is preferably divided internally into two parts, which may be conveniently accomplished by driving into the sleeve, a plug, or partition, 7, the interior of the sleeve at one side of the partition (at the left in Fig. 2) being connected with the suction chamber, 17, by apertures, 24, and the other portion of the sleeve being provided with apertures, 27, communicating with the higher pressure chamber, 18, and with the atmosphere, as the inner end of the sleeve, 20, (at the right in Fig. 2) opens into the interior of the hollow piston rod, which is provided with means for connecting it with the atmosphere. In this instance the piston rod is shown as provided with a plug, 28, provided with lateral inlet apertures, 29, communicating with a longitudinal aperture, 30, in the plug, and the plug, 28, is also provided with an eye, or eyes, for enabling it to be attached to connecting means leading to one or more of the brake mechanisms, as hereinafter described. The suction chamber, 17, is adapted to be connected with the cylinder of the actuator on opposite sides of the piston by means of ports, 34 and 35, in the valve seats, 14 and 15, respectively, and the chamber, 18, is likewise capable of being placed in communication with the cylinder on either side of the piston through ports, 36, in the seat, 16, and an annular aperture, 33, communicating with the seat, 13. Each of the valve chambers, 11 and 12, is provided with a pair of oppositely disposed poppet valves, preferably conical, engaging the opposite valve seats, said valves being preferably formed of molded rubber, and being loose on the actuating sleeve. Said valves may be formed of other material as preferred, and are indicated at 40, 41, 42 and 43. Each of these valves is held seated by yielding means, and means are also provided for sealing the opening in the valve through which the actuating sleeve passes. In the present instance we have shown a rubber cushioning device, 50, of elastic rubber, interposed between the valves, 40 and 41, and between the valves, 42 and 43, said cushioning devices fitting tightly against the outer surface of the valves, and the outer surface of the valve actuating sleeve, and serving the combined purpose of a retracting and seating spring, and sealing means for the adjacent valves. The actuating valve sleeve is provided with suitable means for opening one valve of each pair when the valve sleeve is moved in either direction. As shown in Fig. 2, this function is performed by collars, 22, secured to the sleeve, 20, between the valves, 41 and 42, and end collars, 31 and 32, secured to the valve sleeve outside of the valves, 43 and 40, respectively. In this instance we have shown a construction especially adapted for operation by suction produced by a suction passage of the internal combustion engine, and therefore the interior of that portion of the sleeve, 20, which communicates with the suction chamber, 17, is adapted to be connected with a suction pipe, indicated at 62, and leading in this instance to the intake manifold of the internal combustion engine. This pipe is preferably a flexible pipe to permit the reciprocating movements of the sleeve, 20, and is conveniently connected, as shown in Fig. 2, to a cap, 23, having a passage to receive the pipe, 62, and a passage communicating with the interior of the sleeve, 20, said cap being also provided with an ear, or ears, 25, for attaching it to an operator operated part. We also prefer to provide means for normally maintaining a condition of rarification, or partial vacuum, within the cylinder on both sides of the piston at all times, when the main actuator is in the retracted or "off" position, as set forth in our former application hereinbefore referred to, and one means of accomplishing this result is illustrated in Fig. 2, in which the head of the cylinder, adjacent to which the piston comes to rest when in normal or "off" position, is provided with a passage, 42$^a$, communicating with an auxiliary valve casing, 42$^b$, in which is located a valve seat, 42$^c$, connected by a pipe, 42$^g$, with the opposite end of the cylinder and engaged by a movable valve, 42$^d$, which, during the application of the brakes, is seated and closes communication between the auxiliary valve casing, 42$^b$, and the interior of the cylinder on both sides of the piston. This valve, as shown, is operated by a pin, 42$^e$, extending into the cylinder far enough to be struck by the piston when the piston returns to its normal or retracted, or "off" position, at the right hand end of the cylinder in Fig. 2, so as to insure the opening of the valve, 42$^d$. The valve seat, 42$^c$, is also connected by a flexible pipe, or tube, 42$^f$, with the suction pipe, 62, independent of the connection of the latter with the reversing valve mechanism through the hollow valve sleeve, 20. From this construction it will be noted that when the piston is in off position, and the valve, 42$^d$, is opened, the suction of the manifold will exhaust the air from the cylinder on both sides of the piston and produce and maintain a partial vacuum therein. When the parts are in retracted or "off" position, all of the reversing valves are closed or seated, and the valve sleeve, 20, will have moved to its extreme position (to the right in Fig. 2) where it will be arrested in any suitable manner, as by the engagement of the cap, 23, with the adjustable follower of the stuffing box, 21, for example. A certain amount of lost motion is permitted between the valve actuating sleeve, 20, and the piston, sufficient to effect the opening of one valve of each pair, by a movement of the sleeve in either direction, after which the piston can be moved by the valve sleeve. In this instance this is accomplished by providing the valve sleeve with a collar, 26, located in a recess in the hollow piston rod, 5. In practice, the valve actuating sleeve, 20, is connected, as by a link, 85, to an operator operated part, preferably a foot lever, 88, provided with the usual retracting spring, 89, as indicated in Fig. 1, for example.

In the present instance the main actuator just described is operated by means of suction obtained from a suction passage of the engine, in this instance from the intake manifold, 61, of the internal combustion engine, 60, and in order to provide the maximum suction for operating the brake mechanism with the least interference with the operation of the engine, either by dilution of the explosive charges by the air exhausted from the power actuator cylinder, or by failure to draw the necessary amount of gasoline from the carburetor, the pipe, 62, is preferably provided with an adjustable restricting or regulating valve, 64, adjacent to the intake manifold, a check valve, 65, between the manifold and the valve sleeve, 20, and a normally closed outwardly opening vent valve, 67$^a$, conveniently provided on the check valve, as fully set forth in our former application hereinbefore referred to.

In the operation of the main actuator just described, it will be understood that if the engine is running, the air will be exhausted from the main actuator cylinder on both sides of the piston (and from the auxiliary actuators on both sides of their pistons, as hereinafter described) thus maintaining a partial vacuum in the cylinder, or cylinders, which act as reservoirs or storage space, and obviate the necessity of a regulating or storage tank. When the valve sleeve, 20, is moved forward (in the direction of the arrow in Fig. 2), by the pressure of the operator's foot on the lever, 88, the valves, 41 and 43, will be opened, compressing the cushioning members, 50, more firmly seating the other two valves, 40 and 42, placing the suction chamber, 17, in communication with the cylinder forward of the piston (to the left in Fig. 2) and placing the other end of the cylinder in communication with the atmosphere. Air will instantly rush into the cylinder in rear of the piston (to the right in Fig. 2) and effect the prompt and efficient movement of the piston, in the direction of the arrow Fig. 2, without delivering any material quantity of air to the interior of the manifold, so that the application of the brakes does not affect the operation of the engine and there is no danger of stalling, while idling. As the piston moves away from the auxiliary valve, 42$^d$, the latter will close and shut off communication between the cylinder and the auxiliary suction pipe, 42$^f$, so that the piston will move forward as long as the sleeve, 20, is moved forward, and as soon as the movement of the foot lever and sleeve, 20, stops, the piston will move forward far enough to permit the valves, 41 and 43, to close, when it will be held in balanced position, as indicated in Fig. 2. When the operator releases the foot lever, it is moved rearwardly by its retracting spring, 89, thus moving the valve sleeve, 20, in the direction opposite that of the arrow in Fig. 2, opening the valves, 40 and 42, and connecting the cylinder in rear of the piston with the suction chamber, 17, and the cylinder forward of the piston with the atmosphere through the passage, 19, whereupon the air previously admitted to operate the piston will be withdrawn and air will be admitted forward of the piston to return it to its off position. The restricting valve, 64, causes this air to be gradually distributed into the intake manifold without interfering with the operation of the engine, and as the piston reaches its normal position, the auxiliary valve, 42$^d$, is opened and the valves, 40, and 42, are closed, and the air is exhausted from the cylinder on the forward side of the piston, leaving a partial vacuum on both sides of the piston, ready for the next operation of the actuator.

According to our present invention, a main power actuator is combined with an auxiliary actuator cylinder, or cylinders, containing an actuator piston, or pistons, the main actuator being operatively connected with certain brake mechanisms of an automotive vehicle, and the auxiliary actuator pistons being connected to certain brake mechanisms of the vehicle, so that all of the brake mechanisms may be simultaneously applied by power, thus relieving the operator from the necessity of relying upon his physical power, or force, to actuate the brake mechanisms, while the provision for limited lost motion between the valve actuating sleeve, 20, and the piston hereinbefore described, will enable the operator to add his physical force to the force exerted by the actuator when desired, by moving the foot lever beyond the limits of the lost motion necessary to operate the valves so as to bring the collar, 26, into engagement with either end of the recess in the piston rod, 5, of the main actuator, and enabling the operator, in case of failure of the power for any reason to apply the brake mechanism connected with the main actuator, by his physical power alone, for the purpose of preventing accidents, as will be readily understood. In Fig. 1, we have illustrated diagrammatically an installation, adapted for use in connection with a vehicle having six wheels, each of which is provided with brake mechanism which may be of any desired type, and will usually include a brake drum, a brake band, and a brake operating lever, as conventionally illustrated in Fig. 1. For convenience of reference, we have indicated the front wheel brake mechanisms at 44 and 45, the intermediate wheel brake mechanisms at 46 and 47, and the rear wheel brake mechanisms at 48 and 49. The main actuator, indicated at 1, in Fig. 1, is mounted on the chassis, and is connected with the internal combustion engine and with the foot lever, in the manner hereinbefore described. In this figure, the main actuator is shown connected with the intermediate wheel brake mechanisms, 46 and 47, by means of suitable linkage which may be of any desired type according to the style of brake mechanism, and the location of the several parts, and is represented more or less diagrammatically in Fig. 1. 51 represents an auxiliary actuator mounted on the chassis of the vehicle, and comprising (as shown in Fig. 2 at the right) an actuator cylinder, provided with a double acting piston, 52, without valve mechanism, and having a piston rod, 53, connected therewith, and projecting through one head of the cylinder, 51, and provided with an ear, or ears, 54, by means of which it is connected to certain other of the brake mechanisms of the vehicle, in this instance the rear wheel brakes 48 and 49, by suitable linkage diagrammatically illustrated in Fig. 1. The portion of the auxiliary actuator cylinder, 51, forward of the piston (to the left in Figs. 1 and 2) is connected by a pipe, 55, with the corresponding portion of the main actuator cylinder and the portion of the auxiliary actuator cylinder, 51, in rear of the piston (to the right in Figs. 1 and 2) is connected by a pipe, 56, with the corresponding portion of the main actuator cylinder. In Fig. 1, we have also shown a second auxiliary actuator, indicated at 71, which is secured to the chassis of the vehicle adjacent to the forward portion thereof, and is constructed in exactly the same manner as indicated in Fig. 2, with respect to the auxiliary actuator, 51, the piston rod, 73, thereof being connected by suitable linkage, including a rock shaft, 77, with the front wheel brakes, 44 and 45. In this instance the auxiliary actuator, 71, is shown in position to exert its power forwardly to apply the front wheel brake, and therefore the portion of the actuator cylinder, 71, in rear of the piston, 72, is connected by a pipe, 75, with the main actuator cylinder forward of the piston thereof, and likewise, the portion of the cylinder, 71, forward of the piston, is connected by a pipe, 76, with the corresponding portion of the main actuator cylinder, in rear of its piston. It follows from this construction that when the engine is running, the air will be exhausted from the main and auxiliary actuator cylinders on both sides of the piston thereof, and when the valve mechanism is operated by depressing the brake pedal so as to apply the brakes, air will be admitted, as before described, to the main actuator cylinder in rear of the piston thereof, and will be likewise admitted to the corresponding portions of the auxiliary cylinders, thereby simultaneously applying all of the brake mechanisms for all six wheels, as clearly indicated in Fig. 1. When the brake pedal is released and withdrawn by its retracting spring, shifting the valve sleeve, 20, in the direction opposite to the arrow in Fig. 2, the air previously admitted to the main and auxiliary cylinders will be exhausted and air will be admitted to the main and auxiliary cylinders on the opposite sides of the respective pistons therein, to return the pistons and brake mechanisms to their normal positions. As previously stated, by reason of the limited lost motion provided between the valve sleeve, 20, and the main actuator piston, when the brakes are applied, the operator can, by forcing down the pedal far enough to take up such lost motion, add his physical power to the brakes, 46 and 47, connected with the main actuator. In some instances we may also connect the brake pedal lever, 88, with certain of the other brake mechanisms actuated by one or other, or more than one of the auxiliary actuators, so that the physical power of the operator may be directly applied to such brake mechanisms in addition to that applied by the auxiliary actuator, or actuators, connected therewith. For example, in Fig. 1, we have shown the brake pedal lever, 88, connected by a link, 87, with an arm, 87ª, on the rock shaft, 77, connected with the front wheel brakes, 44 and 45, the said link being also preferably provided with a limited amount of lost motion, which may be varied by slightly enlarging the pivotal apertures in the link, 87, or slotting the link in a well known way, so that the physical power of the operator may also be applied to the front wheel brakes in addition to the power of the auxiliary actuator, 71. In like manner, in case power fails, for any reason, the operator may apply the brakes connected with the main actuator, and with the pedal lever, if such connection is employed, by exerting his physical force on said pedal lever, 88, as the first portion of such movement will set the valves in a position to vent the main actuator cylinder, and consequently the auxiliary actuator cylinders, and on taking up the lost motion, may actually, by physical force, apply the brakes so connected for the purpose of averting accident or otherwise slowing or stopping the vehicle in case the power fails.

In the application of our present invention to brake mechanisms, the power actuator controlled by its reversing valve mechanism, and the auxiliary actuator controlled by the reversing valve mechanism of the main actuator may be combined structurally in various ways. The actuator cylinders may be arranged side by side, or longitudinally, or at a distance from each other, and the piston of the auxiliary actuator may be applied to a separate piston rod, as in Fig. 1, or may be applied in some instances to the same piston rod as the piston of the main actuator for the purpose of increasing the power of the main actuator upon the brake mechanism connected therewith. In Fig. 4, for example, we have shown an embodiment of our invention in which a main actuator and an auxiliary actuator are combined in an integral structure, and arranged coaxially. In this figure, 101, represents the cylinder of the main actuator, provided with the piston, 103, the reversing valve mechanism, indicated as a whole at 140, the valve actuating sleeve being indicated at 120. The auxiliary actuator cylinder is indicated at 151, and is arranged coaxially with the cylinder, 101, and separated therefrom by an intermediate head, or partition, 102. In this instance we have shown the auxiliary valve, 142$^d$, located in the exterior head of the auxiliary cylinder, 151, and connected by a pipe, 142$^g$, with the opposite end of the cylinder, 151, and the corresponding end of the main cylinder, 101. We have also shown the corresponding ends of the cylinders, 101 and 151, on the opposite sides of their pistons connected by a pipe, 142$^h$, and the valve seat for the valve, 142$^d$, provided with a pipe, 142$^f$, adapted to be connected with the main suction pipe, 162 so that the auxiliary valve 142$^d$, and its actuating stem, 142$^e$, operate in the same manner and for the same purpose with respect to both cylinders as the corresponding valve, 42$^d$, and its stem, 42$^e$, acts with respect to the main and auxiliary cylinders in the construction illustrated in Fig. 2. The piston, 152, of the auxiliary actuator is secured to the same piston rod, 105, to which the main actuator piston is attached, so that both pistons operate upon the same brake mechanisms with greater force than would be possible when only one piston is employed.

In Figs. 5, 6, 7, 8 and 10, we have illustrated, diagrammatically, various brake installations in a motor vehicle embodying our present invention, and illustrating the wide variety of its application. These various installations will be briefly described.

Referring to Fig. 5, we have shown an installation for a six wheel vehicle, provided with six brake mechanisms, illustrated at 244—245, 246—247 and 248—249, representing the front, intermediate and rear wheel brakes, respectively. 201 represents the main actuator of the type shown in Fig. 4 and just previously described, and combined with an auxiliary actuator, indicated at 251, the piston of which is connected with the same piston rod, 205. The piston rod, 205, is directly connected to the intermediate and rear wheel brakes, by means of a rock shaft, 277, and appropriate linkage for simultaneously applying the brakes thereto, and enabling said brakes to be also controlled by the physical force of the operator when necessary or desirable, in the manner hereinbefore described, said actuator being connected to the intake manifold, 261, of the engine, 260, by suction pipe, 262. The regulating valve and check valve are not illustrated in these diagrammatic views, but it will be understood that the practice will follow that indicated in Fig. 1. In this instance we have shown a slightly modified form of auxiliary actuator, illustrated in detail in Fig. 13. The cylinder of the said auxiliary actuator is indicated at 271, and is provided with two opposed pistons, 272 and 272$^a$, connected to separate piston rods, 273 and 273$^a$, each of which is connected to one of the front wheel brakes, 244 or 245. In this instance the space in rear of the pistons of the main and auxiliary actuators, 201, 251, is connected by pipe, 256, with the auxiliary actuator cylinder between the pistons, 272 and 272$^a$. The opposite end portions of the auxiliary cylinder are connected by a pipe, 255$^a$, and one of said end portions is connected with the corresponding end portion of the main actuator cylinder by pipe, 255. 288 represents the pedal lever connected to the valve sleeve, 220, by a suitable link, 285. The operation of the brake mechanism will be as previously described, except for the particular brakes actuated by the several cylinders, and the physical force of the operator may be applied when desired to the intermediate and rear wheel brakes.

In Fig. 6 we have shown a different installation for a six wheel vehicle, in which 301 represents the main actuator, constructed and operating as hereinbefore described with reference to Figs. 2 and 3, except that the piston rod, 305, extends through the forward end of the cylinder, the valve actuating sleeve, 320, thereof being connected to the pedal lever, 388, by the link, 385. 362 represents the suction pipe to the intake manifold, 361, of the engine, 360. The piston rod, 305, of the main actuator is in this instance shown connected to a rock shaft, 377, by a sleeve, 377$^a$, and yoke, 377$^b$, provided with suitable linkage connecting it with the front wheel brakes, 344 and 345. We have also shown a double piston, valveless, actuator of the kind illustrated in connection with the front wheel brakes in Fig. 5, indicated at 351, one piston being connected to the rear wheel wheel brakes, 348 and 349, and the other piston being connected by proper linkage with the intermediate wheel brakes, 346 and 347. The main and auxiliary actuators are connected for joint operation by the pipes, 355 and 356. In this case the physical force of the operator can only be applied to the front wheel brakes, to the pedal lever, 388, in the same manner as hereinbefore described.

Fig. 7 represents an installation in a six wheel vehicle corresponding substantially with that shown in Fig. 5, except that no brake mechanism is used on the front wheels, the parts represented in this figure being given the same numbers as in Fig. 1, with the addition of 400, and need not be described in detail.

The embodiments of our invention illustrated in Figs. 4 and 5 are not specifically claimed herein, as they form the subject matter of a divisional application filed by us on the 25th day of January, 1927, and given Serial No. 163,349.

In Fig. 8 we have shown another installation for a six wheel vehicle, in which we have illustrated as the main actuator, a double piston actuator of the type covered by our former application for Letters Patent of the United States filed June 26, 1924, and given Serial No. 722,487, a sectional view of which is illustrated in Fig. 9. As the specific form of these duplex actuators form no part of our present invention, it will not be particularly described, beyond stating that it comprises a cylinder, 501, main piston, 503, provided with reversing valve mechanism, indicated as a whole at 540, and controlled by a longitudinally movable valve sleeve, 520, having a limited amount of movement, or lost motion, with respect to the piston, the main piston rod, 505, extending through one head of the cylinder, and the cylinder being also provided with what we have termed a floating piston, 503ᵃ, without valve mechanism, having a separate piston rod, 505ᵃ, extending through the other head of the cylinder, the two end portions of the cylinder being connected by a pipe or by-pass, 590, and the reversing valve mechanism being constructed to exhaust the air from the central portion of the cylinder, 501, between the pistons to effect the movement of the pistons toward each other to apply the brake mechanisms connected with their respective piston rods, by admitting air to the end portions of the cylinder, and to reverse these connections to return the pistons and connected brake mechanisms to normal position. The sleeve, 520, as shown in Fig. 9, is actuated by a frame, 585, operatively connected with the pedal lever, indicated at 588, in Fig. 8. In this instance the main piston of the main actuator, 503, is connected to a rock shaft, 577, which is connected by suitable linkage with the intermediate wheel brakes, 546 and 547, and the so-called floating piston, 503ᵃ, of the main actuator is connected to a rock shaft, 577ᵃ, and by suitable linkage with the front wheel brake mechanisms, 544 and 545. 562 represents the suction pipe connecting the main actuator with the intake manifold, 561, of the engine, 560, and supplying power for the main actuator and the auxiliary actuator hereinafter described. In Fig. 8 we have shown, at the rear end of the chassis, an auxiliary actuator, indicated at 551, of the single piston type, the piston, 552, being connected with the rear brakes, 548 and 549. In this form of installation, the brakes of all of these wheels will be simultaneously applied and released by power under the control of the foot lever, and in case of failure of power, the foot lever can be applied to directly apply the brake mechanism for the intermediate wheels. The main actuator is connected with the auxiliary actuator by pipes, 556 and 555, in the manner hereinbefore indicated, so as to insure the joint operation of the main and auxiliary actuators.

In Fig. 10 we have shown another form of installation, also designed for a six wheel vehicle, in which the main actuator, 601, is of the type illustrated in Fig. 9, having one valved piston and one floating piston, the main piston of which is connected by a suitable linkage with the intermediate wheel brake mechanism, 646 and 647, and the floating piston is connected with the front wheel brake mechanism, 644 and 645, under the control of the pedal lever, 688, deriving its power from the intake manifold, 661, of the engine, 660, by the suction pipe, 662, as hereinbefore described. In connection with the double piston main actuator, we employ a double piston auxiliary actuator, 671, without valve mechanism, of the kind illustrated in detail in Fig. 13, arranged transversely of the chassis, and having the pistons connected respectively to the rear wheel brakes, 648 and 649 thereto, the necessary levers and linkage, for example, as shown, and the necessary pipe connections, 656 and 655, being employed for connecting the various portions of the main actuator cylinder with the corresponding portions of the auxiliary actuator cylinder so as to effect the simultaneous operation of all the actuators under the control of the main reversing valve mechanism. In this construction the operator can, by physical power, apply the intermediate wheel brake mechanisms, on failure of power.

It is to be understood that our invention is readily adaptable to installations in which a trailing vehicle is connected to and propelled by the main automotive vehicle, in which case it is only necessary to install one or more auxiliary actuators on the trailing vehicle, and provide flexible portions in the pipe connections between the main and auxiliary actuators so as to enable the brake mechanisms with which the wheels of the trailing vehicle may be provided to be actuated simultaneously with those of the main vehicle, as will be readily understood.

Fig. 11 represents a main actuator of the type illustrated in Fig. 9, with a main and floating piston, combined structurally with an auxiliary valveless actuator, the piston of which is coaxial with the main actuator pistons and is secured to the piston rod with which the main piston of the main actuator is connected. In Fig. 12 we have shown an installation in which the form of main and auxiliary actuators illustrated in Fig. 11, is connected, with the brake mechanism. Referring to these figures, 701, is the main cylinder, provided with the main piston, 703, and the floating piston, 703$^a$, the main piston rod being indicated at 705, and the piston rod connected with the floating piston being indicated at 705$^a$. The auxiliary cylinder, indicated at 751, is coaxial with the main cylinder, and connected therewith in a unitary structure, and the auxiliary piston, 752, is mounted on the main piston rod, 705. 720 represents the valve sleeve operating the valve mechanism in the hub of the main piston, 703, said valve mechanism being indicated as a whole at 740. The central portion of the main cylinder is connected to one end of the cylinder, 751, by a pipe, 742$^h$, the opposite ends of the main cylinder are connected together and to the outer end of the auxiliary cylinder by pipe, 742$^g$. The operation of this device will be just the same as that described with reference to Fig. 9, except that the operation of the main piston, 703, is assisted by the auxiliary piston, 752. As indicated in Fig. 12, this construction can be very advantageously arranged in a motor vehicle having six wheel brakes, in which instance the piston rod, 705$^a$, for the floating piston, 703$^a$, is connected by means of a yoke, 705$^b$, suitable links, and a rock shaft, 777, with the front wheel brakes, 744 and 745. The piston rod, 705, connected with the main piston, 703 and auxiliary piston, 752, are connected by suitable links to the rock shaft, 778, and 779, which are in turn connected with the intermediate wheel brakes, 746, 747 and 748, and 749, in the manner indicated in Fig. 12. In these figures, 762 represents the suction pipe connecting the valve rod, 720, with the intake manifold, 761, of the engine, 760. In the installation shown in Fig. 12, it will be noted that the forward wheel brakes are connected to the floating piston, while the four wheel brakes for the intermediate and rear wheels are connected with the main actuator piston and auxiliary actuator pistons, so as to be acted on by the force of both of said pistons, and the physical force of the operator may be applied to the intermediate and rear wheel brakes, in the manner previously described.

The embodiments of our invention illustrated in Figs. 8, 9, 10, 11 and 12, are not specifically claimed herein, as they form the subject matter of a divisional application filed by us on the 25th day of January, 1927, and given Serial No. 163,350.

In Fig. 13 we have shown a form of auxiliary actuator heretofore referred to with reference to several of the special installations illustrated. This is a convenient form of auxiliary actuator in that it is provided with two double acting pistons, working oppositely to each other and being capable of being connected to different brake mechanisms. In this figure, which represents, for example, the form of auxiliary actuator illustrated in Fig. 5, the cylinder, 271, is shown provided with two pistons, 272 and 272$^a$, having each a piston rod, indicated at 273, 273$^a$, respectively, one pipe, 256, being connected to the cylinder between the pistons and the opposite ends of the cylinders being connected by a pipe, 255$^a$, to which a connecting pipe, 255, may be connected, as shown in Fig. 13, or the pipe, 255$^a$, may be connected to one of the cylinder heads, or to the side of the cylinder adjacent to either end, as may be most convenient.

In some instances we may find it convenient or desirable to supply special casings for the valve mechanism independently of the hub of the main piston of the main actuator in which it is located in our preferred construction, and such a construction is illustrated in Fig. 14. As indicated in this figure, the valve mechanism is contained in a housing, 810, in which are formed the suction chamber, 817, and valve chambers, 811, 812, provided with oppositely disposed valves, 840, 841, 842 and 843, constructed and operating substantially as indicated in Fig. 3, and held seated by cushioning and sealing rings, 850. In this case instead of having ports in the valve seats communicating with a cylinder on opposite sides of the piston, we provide the chamber, 811, with a port, 834, which is connected by pipes, 855, and branch pipes, 855$^a$, with the forward end of each of a plurality of auxiliary actuator cylinders, indicated at 851, 871 and 891, for example, and the valve chamber, 812, is provided with a similar port, 835, connected by pipe, 856, and branch pipes, 856$^a$, with the opposite ends of said auxiliary actuator cylinders. The housing, 810, is also provided with a by-pass, 819, connecting the inlet or higher pressure chamber, 818, which in this instance communicates with the atmosphere through an aperature, 829, and aperatures, 827, in the valve sleeve, 820, with the valve seat for the valve, 840. The valve actuating rod, 820, extends through the housing, 810, which is provided at one end with a stuffing box, 821. Said sleeve is provided with a plug, or partition, 807, and with apertures, 824, forward of said partition communicating with the suction chamber, 817. The valve sleeve is also connected by a pipe, 862, with the intake manifold, or other source of suction, and the valve sleeve is also provided with a lug, 825, which is connected with an operator operated device. The rear end of the sleeve, 820, is provided with a collar, 826, located in a recess in the housing, which provides for a limited amount of lost motion between the sleeve and housing, sufficient to operate the valves by movements of the sleeve in either direction, as hereinbefore described with reference to Fig. 3. The housing, 810, is also provided with a lug, 810ª, by means of which it may be connected if desired, to a fixed portion of the chassis, in which case the connecting pipes, 855, may be rigid pipes. In some instances we may connect the housing by means of the lug, 810ª, by suitable linkage to one or other of the brake mechanisms of the vehicle, so that the forward movement of the rod, 820, will not only operate the valve mechanism so as to effect the operation of the auxiliary actuators, but as soon as the lost motion between the sleeve and housing is taken up, the force of the operator's foot will be directly applied to the brake mechanism connected with the housing. In this case it is necessary that the pipes, 855 and 856, shall be connected to the housing, 810, by flexible sections, to permit of the necessary longitudinal movement of the housing. The upper portion of Fig. 14, illustrating the auxiliary actuators, is diagrammatic, and it will be understood that the piston rods of the several auxiliary actuator pistons, indicated at 853, 873 and 893, respectively, will be connected to parts of the brake mechanism with which the vehicle may be provided, and that the pistons of all of these auxiliary actuators will be responsive to the valve mechanism contained in the housing in exactly the same manner as if the valve mechanism were in the hub of a main piston of a main actuator, as hereinbefore described.

Assuming that the casing, 810, is connected in the linkage to one of the brake mechanisms as above stated, the operation of the device will be as follows. In the initial position of the valve mechanism in the housing, the valve sleeve will be held in its rearmost position by the retracting spring of the foot lever, and the valves, 840—842, will be held open, connecting the rear end of each auxiliary actuator cylinder with suction, and the forward end thereof with the atmosphere, by way of the by-pass, 819. The first pressure on the foot lever will cause the sleeve, 820, to move forward, allowing the valves, 840 and 842, to close, and the further foward movement of the sleeve, 820, will open the valves, 841 and 843, connecting each of the auxiliary cylinders on the end forward of the piston with suction, and admitting atmospheric pressure to the cylinders in rear of the piston, and thereby causing the piston in each of said auxiliary actuator cylinders, to move in a direction to apply the brakes. If this pressure should not be sufficient for braking purposes, and further braking power is needed, the operator, by further depressing the foot lever and transferring his physical power to the housing through the collar, 826, can apply additional power to the brakes connected to the valve casing, or housing, 810. On releasing the foot lever, the retracting spring causes the valve actuating sleeve to move backward faster than the casing, thus closing the valves, 841 and 843, and opening the valves, 840 and 842, and releasing the brakes.

In Fig. 15 we have shown a modification of the valve structure illustrated in Fig. 14, and an installation containing the same is illustrated in Fig. 16. The various parts of the valve mechanism and installation are given the same numerals as have been used heretofore, with the addition of 900, in order to avoid confusion. In this valve mechanism shown in detail in Fig. 15, the two centrally located valves on opposite sides of the suction chamber, 917, to wit, the valves, 941 and 942, are so constructed and arranged with reference to the valve actuating sleeve, 920, that when the parts are in normal or off position, the valves, 941 and 942 will both be held open, thereby producing a partial vacuum or rarification in each of the actuator cylinders, 951, 971 and 991, connected therewith on both sides of the pistons therein. In order to accomplish this result, we prefer to provide an adjustable stop, indicated at 995, for limiting the return movement of the valve mechanism under the action of the retracting means, for the brake mechanism, when the brakes are released, so that it will be brought to rest always at the same point, and we also provide means for arresting the return movement of the valve actuating sleeve, 920. As the return movement of the valve sleeve is usually effected by the retracting spring, 989, of the foot lever, we conveniently provide an adjustable stop, 996, for arresting the foot lever under the action of its retracting spring, and thereby limiting the return movement of the valve actuating sleeve, 920, in a direction opposite to that indicated by the arrow in Fig. 15. The actuating collars, 920ª and 920ᵇ on the valve actuating sleeve 920, which effect the opening movements of the valve, 941 and 942, are so located that when the valve cassing, 910, is arrested by the stop, 995, and the valve actuating sleeve is arrested by the engagement of the foot lever, 988, with its stop, 996, in the normal or off position of the apparatus the valves, 941 and 942, will, as before stated, be both held in open position, as indicated in Fig. 15, so that the suction through the suction pipe, 962, sleeve, 920, and suction chamber, 917, will produce a rarified condition on both sides of the piston in each of the valveless actuators connected with the valve mechanism. When the foot lever is moved forward, therefore, the valve actuating sleeve, 920, will move in the direction of the arrow in Fig. 15, with the result that the valve, 941, will be opened further, the valve, 942, will be permitted to close under the action of its cushioning and sealing means, 950, after which the valve, 943, will be opened, thus continuing the communication between the suction chamber and the forward side of each cylinder of the actuators connected with the valve mechanisms, and admitting atmospheric air in rear of each piston, and effecting the operation of the brakes connected with the several actuators without admitting any appreciable quantity of air to the intake manifold. As illustrated in Fig. 16, the valve casing, 910, is connected by a link, 997, with the brake mechanism operated by the valveless actuator, 991, and as the nut or enlargement, 926, on the sleeve, 920, within the recess in the valve body provides lost motion between the sleeve, 920, and the valve casing, the operator may, by further depressing the foot lever after the actuator has operated to its fullest extent, add his physical force to any of the brake mechanisms (in this instance the brakes, 946, 947), which are connected with the foot lever. It will also be understood that when the brakes are applied, as above stated, the valve body, 910, will be drawn away from the stop, 995, and when the operator releases the foot lever, 998, and permits its retracting spring to quickly retract it, the sleeve, 920, will be moved rearwardly in a direction opposite that of the arrow in Fig. 15, sufficiently to close the valve, 943, and open the valve, 942, before the valve, 941, is completely closed, thereby permitting an equalization of pressures in the opposite ends of each actuator cylinder, which permits the applied brakes to release themselves, after which the valve, 941, closes, and the valve, 940, is opened, thereby withdrawing the air in rear of the piston in each valveless actuator, and admitting atmospheric air on the forward side of each of said pistons, to produce the return movement of the brake mechanism. As the parts return to their normal or off positions, the foot lever will be arrested by the stop, 996, thereby stopping the return movement of the sleeve, 920, and as the valve body comes to rest against the stop, 995, the valves, 941 and 942, will be held in open position, thereby equalizing the pressures in the cylinders of the valveless actuators, and producing rarification on both sides of the pistons therein.

In the preceding description of Figs. 15 and 16, we have used the term "forward" as meaning a movement of the actuator piston in a direction to apply the brake, and "rearward" as meaning a movement of the actuator piston in a direction to release the brake.

In case of failure of power, the operator may nevertheless apply the brake mechanisms connected with the foot lever by physical power, as the first movement of the foot lever will move the valve mechanisms into position to vent the cylinders.

In some instances where we employ reversing valve mechanism of the kind shown in Fig. 14, independent of any actuator piston for controlling one or more valveless actuators, we may provide the valve casing with a retracting spring of its own for holding it normally against a stop and connect the valve casing to certain of the brake mechanism, by linkage providing for a certain amount of lost motion, so that very slight movements of the foot lever, sufficient only to operate the valve mechanism will apply the brakes operated by the valveless actuators, the valve casing not moving forward ordinarily with the brake mechanism. When, however, it is desired to apply the physical force of the operator to the brake mechanism operatively connected with the valve casing, this may be accomplished by pressing the foot lever forward sufficiently to take up the lost motion in the connections between the valve casing and the brake mechanism.

We have illustrated diagrammatically such an arrangement in Fig. 17, in which 810ˣ, represents the valve casing containing reversing valve mechanism, such, for example, as illustrated in Fig. 14. 820ˣ represents the valve actuating sleeve connected by the link, 885, with the foot lever, 888, provided with the usual retracting spring, 889, valve mechanism being connected by pipes, 855ˣ and 856ˣ, having flexible connections where necessary with one or a plurality of valveless actuators, in the manner illustrated, for example, in Fig. 14, or in Fig. 16, one of such actuators, 891ˣ, being connected to a rock shaft for controlling brake mechanism, illustrated at 846, 847, for example to which it is also desired to connect the valve casing, 810ˣ. The valve casing, 810ˣ, is connected by a link, 897, with an arm, 893ˣ, on the rock shaft, 892, and said link, 897, is provided with a slot, 894ˣ, to allow for a certain amount of lost motion. In this instance the valve casing, 810ˣ, is provided with a retracting spring, 896, connected therewith, and normally holding the casing back against the stop, 895, when the parts are in the off or normal position. In this instance the valve casing may be supported vertically in any desired way, which will permit the necessary longitudinal movement of the valve casing, when desired.

The parts being in the off position, as indicated in Fig. 17, it will be obvious that the operator can, by a very slight movement of the foot lever, sufficient only to operate the valve mechanism, effect the operation of all the valveless actuators connected with the valve mechanism and apply all of the brakes operated thereby and release the same, as the lost motion provided in this instance by the slot, 894ˣ, will permit the brakes connected with the link, 897, to be operated by the actuator 891ˣ without any forward movement of the valve casing, 810ˣ, which, therefore, does not follow the movement of the foot, unless it becomes desirable for any reason to apply the physical force of the operator to the brake mechanism operatively connected with the foot lever through the valve actuating sleeve, 820ˣ, and the linkage from the valve casing to such brake mechanism, in which case the foot lever can be depressed sufficiently to take up the lost motion provided by the slot, 894ˣ, thus moving the valve casing, 810ˣ bodily forward with its link, 897, and enabling the operator to exert his physical force to the brake mechanism connected with such linkage, as the brake mechanism, 846, 847, in addition to the power exerted by the valveless actuator connected therewith, or in case of failure of power, in which case the movement of the reversing valve mechanism will vent the valveless actuators, so that the piston in the actuator, 891ˣ, will offer practically no resistance to the application of the brakes under such conditions.

The embodiments of our invention shown in Figs. 14, 15, 16 and 17, are not specifically claimed herein, as they form the subject matter of a divisional application filed by us on the 25th day of January, 1927, and given Serial No. 163,351.

What we claim and desire to secure by Letters Patent is:—

1. In automotive vehicles provided with an internal combustion engine having a suction passage, and brake mechanisms, the combination with a plurality of power actuators, each comprising a cylinder and piston, and means for connecting said pistons with certain of said brake mechanisms, of a single, longitudinally movable controlling valve mechanism for controlling all of said actuators operatively connected with at least one of said pistons and movable therewith and communicating with all of said actuator cylinders, means for connecting each of the actuator cylinders simultaneously with the suction passage of the engine and with the atmosphere on opposite sides of each piston, under the control of said valve mechanism, and an operator operated part connected with said valve mechanism.

2. In automotive vehicles provided with an internal combustion engine having a suction passage and brake mechanisms, the combination with a plurality of power actuators, each comprising a cylinder and piston, and means for connecting the pistons with certain of said brake mechanisms, of a single, controlling valve mechanism for all of said actuators, communicating with all of said actuator cylinders, means for connecting all of the actuator cylinders simultaneously with the suction passage of the engine and with the atmosphere on opposite sides of each piston under the control of said valve mechanism, and an operator operated part connected with said valve mechanism, and means for connecting the operator operated part with certain of said brake mechanisms, whereby the brake mechanism connected with the operator operated part can be operated directly by the physical force of the operator should the power fail.

3. In automotive vehicles, provided with an internal combustion engine having a suction passage and brake mechanisms, the combination with a plurality of power actuators, each comprising a cylinder and piston, of a single controlling valve mechanism for all of said actuators, communicating with all of said actuator cylinders, means for connecting each of the actuator cylinders simultaneously with the suction passage of the engine and with the atmosphere under the control of said valve mechanism, an operator operated part connected with said valve mechanism, means for connecting the operator operated part with the brake mechanism to which at least one of said actuator pistons is connected, whereby the operator may add his physical force to said brake mechanism, and may operate said brake mechanism independently of the actuators in case of failure of power.

4. In automotive vehicles provided with an internal combustion engine having a suction passage and brake mechanisms, the combination with a plurality of power actuators, each comprising a cylinder and piston, and means for connecting said pistons with certain of said brake mechanisms, of a single controlling valve mechanism for all of said actuators communicating with all of said actuator cylinders, means for connecting each of the actuator cylinders simultaneously with the suction passage of the engine and with the atmosphere under the control of said valve mechanism, an operator operated part for controlling said valve mechanism, means for connecting the operator operated part with certain of said brake mechanisms through said valve mechanism, said means including a provision for lost motion sufficient to insure the operation of the valve mechanism.

5. In automotive vehicles provided with an internal combustion engine having a suction passage, and brake mechanisms for any vehicle, propelled thereby, the combination with a main power actuator comprising a cylinder and piston, controlling valve mechanism for the said actuator located in the hub of the piston, means for connecting the cylinder with said suction passage and the atmosphere under the control of said valve mechanism, and an operator operated part connected with said valve mechanism, of a valveless auxiliary actuator comprising a cylinder and piston, tubular connections between said cylinders for enabling the valve mechanism of the main actuator to simultaneously control the pistons of the main and auxiliary actuators, and means for connecting each piston to certain of said brake mechanisms.

6. In automotive vehicles provided with an internal combustion engine having a suction passage, and brake mechanism for any vehicle propelled thereby, the combination with a main power actuator comprisng a cylinder and piston, controlling valve mechanism for the actuator located in the hub of the piston, means for connecting the cylinder with said suction passage and the atmosphere under the control of said valve mechanism, and an operator operated part connected with said valve mechanism, of a valveless auxiliary actuator comprising a cylinder and piston, tubular connections between said cylinders for enabling the valve mechanism of the main actuator to simultaneously control the pistons of the main and auxiliary actuators, and means for connecting each piston to certain of said brake mechanisms, and operative connections through said valve mechanism from the operator operated part to certain of said brake mechanisms.

7. In automotive vehicles, provided with an internal combustion engine having a suction passage, and brake mechanisms for any vehicle propelled thereby, the combination with a main power actuator comprising a cylinder and piston, controlling valve mechanism for the actuator located in the hub of the piston, means for connecting the cylinder with said suction passage and the atmosphere under the control of said valve mechanism, of a valveless auxiliary actuator comprising a cylinder and piston, tubular connections between said cylinders for enabling the valve mechanism of the main actuator to simultaneously control the pistons of the main and auxiliary actuators, and means for connecting each piston to certain of said brake mechanisms, and operative connections from said operator operated part through said valve mechanism to brake mechanism to which at least one of said pistons is connected.

8. In automotive vehicles provided with an internal combustion engine having a suction passage, and brake mechanisms for any vehicle propelled thereby, the combination with a main power actuator comprising a cylinder and piston, controlling valve mechanism for the actuator located in the hub of the piston, means for connecting the cylinder with said suction passage and the atmosphere under the control of said valve mechanism, an operator operated part connected with said valve mechanism, of a valveless auxiliary actuator comprising a cylinder and piston, tubular connections between said cylinders for enabling the valve mechanism of the main actuator to simultaneously control the pistons of the main and auxiliary actuators, and means for connecting each piston to certain of said brake mechanisms, connections from said operator operated part through said valve mechanism to brake mechanism to which at least one of said pistons is connected, said connections containing provision for lost motion sufficient to insure the operation of said valve mechanism, whereby the operator can add his physical force to the brake mechanism connected with the operator operated part, and operate said mechanism independently of the operation of the other actuators in case of failure of power.

9. In automotive vehicles provided with an internal combustion engine having a suction passage, and brake mechanism for any vehicle propelled thereby, the combination with a main power actuator comprising a cylinder, a double acting piston therein, controlling valve mechanism for the actuator located in the hub of the piston, means for connecting the cylinder on opposite sides of the piston with the suction passage of the engine and with the atmosphere under the control of said valve mechanism, and an operator operated part connected with said valve mechanism, of an valveless auxiliary actuator comprising a cylinder and piston, tubular connections between said cylinders for enabling the valve mechanism of the main actuator to simultaneously control the pistons of both actuators, and means for connecting each piston to certain of said brake mechanisms.

10. The combination with a main power actuator comprising a cylinder, a piston therein, controlling valve mechanism for the actuator located in the hub of the piston, means for connecting the cylinder with sources of higher and lower pressure under the control of said valve mechanism, and an operator operated part connected with said valve mechanism, of a valveless actuator comprising a cylinder and piston, tubular connections between said cylinders for enabling the valve mechanism of the main actuator to connect said cylinders simultaneously with said sources of higher and lower pressure, to effect the simultaneous movement of the main and auxiliary pistons, and means for connecting each piston to a part to be operated by it.

11. The combination with a main power actuator comprising a cylinder, a piston therein, controlling valve mechanism for the actuator located in the hub of the piston, means for connecting the cylinder with sources of higher and lower pressure under the control of said valve mechanism, and an operator operated part connected with said valve mechanism, of a valveless actuator comprising a cylinder and piston, tubular connections between said cylinders for enabling the valve mechanism of the main actuator to connect said cylinders simultaneously with said sources of higher and lower pressures, to effect the simultaneous movement of the main and auxiliary pistons, and means for connecting each piston to the part to be operated by it, and operative connections from the operator operated part to at least one of the parts operated by said pistons.

12. The combination with a main power actuator comprising a cylinder, a piston therein, controlling valve mechanism for the actuator located in the hub of the piston, means for connecting the cylinder with sources of higher and lower pressure under the control of said valve mechanism, an operator operated part connected with said valve mechanism, of a valveless actuator comprising a cylinder and piston, tubular connections between said cylinders for enabling the valve mechanism of the main actuator to connect said cylinder simultaneously with said sources of higher and lower pressures, to effect the substantially simultaneous movement of the main and auxiliary pistons, means for connecting each piston to a part to be operated by it, and connections from the operator operated part to at least one of the parts operated by said pistons containing a provision for lost motion sufficient to insure the operation of the valve mechanism.

13. The combination with a main power actuator comprising a cylinder, a double acting piston therein, and means for connecting said piston to a part to be actuated, means for supplying differential pressures in said cylinder on opposite sides of the piston, reversing valve mechanism for said main actuator constructed to maintain the piston in a balanced condition when the valve mechanism is in an interjacent position between its extremes of movement, of an auxiliary valveless actuator comprising a cylinder and a double acting piston therein, said main cylinder being provided with passages for connecting the portions thereof on opposite sides of the main piston, with the portions of the auxiliary cylinder on opposite sides of the auxiliary piston, whereby both actuators will be simultaneously controlled by said reversing valve mechanism.

14. The combination with an automotive vehicle, and brake mechanisms therefor, of a main power actuator comprising a cylinder, a double acting piston therein, operatively connected with certain of said brake mechanisms, means including reversing valve mechanism for establishing differential pressures in said cylinder on opposite faces of the piston, said valve mechanism being constructed to hold said piston in balanced condition in an interjacent position of said valve mechanism between its extreme positions, an auxiliary valveless actuator comprising a cylinder and a double acting piston therein, operatively connected with certain of said brake mechanisms, tubular connections between each end portion of the main actuator cylinder, and the corresponding end portion of the auxiliary actuator cylinder, and operator operated means for actuating the reversing valve mechanism of the main actuator.

15. The combination with an automotive vehicle, and of brake mechanism therefor, of a main power actuator comprising a cylinder, a double acting piston therein, operatively connected with certain of said brake mechanisms, means including reversing valve mechanism for establishing differential pressures in said cylinder on opposite faces of the piston, said valve mechanism being constructed to hold said piston in balanced condition in an interjacent position of said valve mechanism between its extreme positions, an auxiliary valveless actuator comprising a cylinder and a double acting piston therein, operatively connected with certain of said brake mechanisms, tubular connections between each end portion of the main actuator cylinder, and the corresponding end portion of the auxiliary actuator cylinder, and an operator operated part for actuating said reversing valve mechanism connected with the piston by means permitting lost motion, whereby the operator may add his physical force to the brake mechanism connected with the main actuator piston and on failure of the power actuators to function, the operator may operate said reversing valve mechanism to vent the main actuator cylinder and apply by his physical force to the brake mechanism operatively connected with the main actuator piston.

16. The combination with an automotive vehicle, and a plurality of brake mechanisms therefor, of a main power actuator comprising a cylinder, a double acting piston therein, and means including reversing valve mechanism for establishing differential pressures in said cylinder on opposite faces of said piston, said valve mechanism being constructed to hold said piston in balanced condition in an interjacent position of said valve mechanism, an auxiliary valveless actuator comprising a cylinder and a double acting piston therein, a tubular connection between the portion of the main actuator cylinder on each side of the piston therein with the corresponding portion of the auxiliary actuator cylinder, connections from the main actuator piston to certain of said brake mechanisms, and connections from said auxiliary actuator piston to other of said brake mechanisms, and an operator operated part connected with the reversing valve mechanism.

17. The combination with an automotive vehicle, and a plurality of brake mechanisms therefor, of a main power actuator comprising a cylinder, a double acting piston therein, and means including reversing valve mechanism for establishing differential pressures in said cylinder on opposite faces of said piston, said valve mechanism being constructed to hold said piston in balanced condition in an interjacent position of said valve mechanism, an auxiliary valveless actuator comprising a cylinder and a double acting piston therein, a tubular connection between the portion of the main actuator cylinder on each side of the piston therein with the corresponding portion of the auxiliary actuator cylinder, connections from the main actuator piston to certain of said brake mechanisms, and connections from said auxiliary actuator piston to other of said brake mechanisms, and an operator operated part for controlling the reversing valve mechanism connected with the main piston by means permitting lost motion, whereby the operator may add his physical force to the brake mechanism connected with the main actuator and may operate said valve mechanism to vent the main actuator cylinder and apply the brakes connected with the main actuator in case of failure of the power actuators to function by power.

18. The combination with an automotive vehicle, and a plurality of brake mechanisms therefor, of a main power actuator comprising a cylinder, a double acting piston therein, and means including reversing valve mechanism for establishing differential pressures in said cylinder on opposite faces of said piston, said valve mechanism being constructed to hold said piston in balanced condition in an interjacent position of said valve mechanism, an auxiliary valveless actuator comprising a cylinder and a double acting piston therein, a tubular connection between the portions of the main actuator cylinder on each side of the piston therein with the corresponding portion of the auxiliary actuator cylinder, operative connections between said auxiliary actuator piston and certain of said brake mechanisms, operative connections between said main actuator piston and other of said brake mechanisms, an operator operated device for controlling said reversing valve mechanism connected to the main actuator piston by means permitting a limited amount of lost motion, and operative connections between said operator operated part and the brake mechanism operatively connected with the auxiliary actuator piston, whereby the physical force of the operator may be added to the power of said actuators, and whereby on failure of the power actuators to function by power the brake mechanism connected with the operator operated part can be operated by the physical force of the operator.

19. The combination with an automotive vehicle, and a plurality of brake mechanisms therefor, of a main power actuator comprising a cylinder, a double acting piston therein, and means including reversing valve mechanism for establishing differential pressures in said cylinder on opposite faces of said piston, said valve mechanism being constructed to hold said piston in balanced condition in an interjacent position of said valve mechanism, a plurality of valveless actuators, each comprising a cylinder and piston, pipe connections from each end portion of the main actuating cylinder to the corresponding portion of each of the auxiliary actuator cylinders, operative connections from the main actuator piston to certain of said brake mechanisms, connections from each auxiliary actuator cylinder to other of said brake mechanisms, and an operator operated part for actuating the reversing valve mechanism of the main actuator to simultaneously and correspondingly control the movement of said actuator pistons in either direction.

20. The combination with an automotive vehicle, and a plurality of brake mechanisms therefor, of a main power actuator comprising a cylinder, a double acting piston therein, and means including reversing valve mechanism for establishing differential pressures in said cylinder on opposite faces of said piston, said valve mechanism being constructed to hold said piston in balanced condition in an interjacent position of said valve mechanism, a plurality of valveless actuators, each comprising a cylinder and piston, pipe connections from each end portion of the main actuating cylinder to the corresponding portion of each of the auxiliary actuator cylinders, operative connections from the main actuator piston to certain of said brake mechanisms, connections from each auxiliary actuator cylinder to other of said brake mechanisms, an operator operated part for actuating the reversing valve mechanism of the main actuator, connected to the main actuator piston by means permitting a limited amount of lost motion, and connections from said operator operated part to the brake mechanism connected with at least one of said auxiliary actuator pistons.

21. The combination with an automotive vehicle, and brake mechanisms therefor, of a main power actuator comprising a cylinder, a double acting piston therein, and reversing valve mechanism including movable valves, a suction pipe connected with said valve mechanism, means for admitting higher pressure to said valve mechanism, said actuator being provided with means for connecting the actuator cylinder on both sides of the piston therein with said suction pipe when the piston is in the off or normal position, an auxiliary valveless actuator comprising a cylinder, a double acting piston therein, tubular connections between each end portion of the main actuator cylinder and the corresponding portion of the auxiliary actuator cylinder, whereby the auxiliary actuator cylinder on both sides of the piston therein will be connected with the suction pipe when its piston is in normal or off position, connections between the main piston and brake mechanism for the vehicle, a connection between the auxiliary piston and brake mechanism of the vehicle, and operator operated means for actuating the reversing valve mechanism of the main actuator.

22. The combination with an automotive vehicle, and brake mechanism therefor, of a main power actuator comprising a cylinder, a double acting piston therein, and reversing valve mechanism including movable valves, a suction pipe connected with said valve mechanism, means for admitting higher pressure to said valve mechanism, said actuator being provided with means for connecting the actuator cylinder on both sides of the piston therein with said suction pipe when the piston is in the off or normal position, an auxiliary valveless actuator comprising a cylinder, a double acting piston therein, tubular connections for equalizing pressures between each end portion of the main actuator cylinder and the corresponding portion of the auxiliary actuator cylinder, whereby the auxiliary actuator cylinder on both sides of the piston therein will be connected with the suction pipe when the piston of the main actuator cylinder is in normal or off position, connections between the main piston and brake mechanism for the vehicle, a connection between the auxiliary piston and brake mechanism of the vehicle, and operator operated means connected with said reversing valve mechanism of the main actuator, and operatively connected with the piston thereof by means permitting lost motion.

23. In automotive vehicles provided with an internal combustion engine having a suction passage and brake mechanism, the combination with a plurality of power actuators each comprising a cylinder and piston, and means for connecting the pistons with certain of said brake mechanisms, of an operator operated part, a single, longitudinally movable valve mechanism for controlling all of said actuators, comprising parts movable longitudinally relatively with respect to each other, and connected respectively with the operator operated part, and at least one of said pistons, and means for connecting each of the actuated cylinders simultaneously with the suction passage of the engine and with the atmosphere on opposite sides of each piston, under the control of said valve mechanism, whereby said operator operated part and said valve mechanism move with the piston with which it is connected, and said valve mechanism is operated by relative movement between the operator operated part and said piston to control all of said pistons.

24. In automotive vehicles provided with an internal combustion engine having a suction passage and brake mechanism, the combination with a plurality of power actuators each comprising a cylinder and piston, means for connecting the pistons with certain of said brake mechanisms, of an operator operated part, a single, longitudinally movable controlling valve mechanism for connecting the cylinders of all of said actuators on opposite sides of each piston with the suction passage of the engine and with the atmosphere, comprising parts movable longitudinally relatively with respect to each other, and connected respectively with the operator operated part, and valve mechanism connected with at least one of said pistons, said valve mechanism moving bodily with the operator operated part and the piston, and brake mechanism to which the valve mechanism is connected, and being operated by the relative movement between the operator operated part and the said piston, and means for limiting said relative movement, whereby the operator may apply his physical force to the brake mechanism connected with the valve mechanism, in addition to the power of the piston connected therewith, or in case of failure of power.

25. In automotive vehicles provided with an internal combustion engine, having a suction passage and brake mechanism, the combination with a plurality of power actuators, each comprising a cylinder closed at both ends, a piston in said cylinder, and means for connecting the piston of each actuator with certain of said brake mechanisms, of a single valve mechanism for controlling all of said actuators, communicating with all of said cylinders means for connecting each of the actuator cylinders simultaneously with the suction passage of the engine and with the atmosphere on opposite sides of each piston under the control of said valve mechanism, means for normally connecting each cylinder on both sides of the piston therein with said suction passage when the pistons and brake mechanism are in retracted or off position to maintain the pistons submerged in vacuum, and an operator operated part connected with said valve mechanism.

26. In automotive vehicles provided with an internal combustion engine, having a suction passage and brake mechanism, the combination with a plurality of power actuators, each comprising a cylinder closed at both ends, a piston in said cylinder, and means for connecting the piston of each actuator with certain of said brake mechanisms, of a single controlling valve mechanism for all of said actuators, communicating with all of said cylinders, means for connecting each of the actuator cylinders simultaneously with the suction passage of the engine and with the atmosphere on opposite sides of each piston under the control of said valve mechanism, said valve mechanism being constructed to connect each cylinder on both sides of the piston therein with said suction passage when the piston and brake mechanism connected therewith are in retracted or off position to normally maintain the pistons submerged in vacuum, and an operator operated part connected with said valve mechanism.

27. In automotive vehicles provided with an internal combustion engine, having a suction passage and brake mechanisms, the combination with a plurality of actuators each comprising a cylinder closed at both ends, a piston in said cylinder, and means for connecting the piston with certain of said brake mechanisms, of a single, longitudinally movable, controlling valve mechanism for all of said actuators operatively connected with at least one of said pistons, and movable therein, means for connecting all of the actuator cylinders simultaneously with the suction passage of the engine and with the atmosphere on opposite sides of each piston under the control of said valve mechanism, means for normally connecting each cylinder on both sides of the piston therein with said suction passage when the piston and brake mechanism connected therewith are in retracted or off position, to maintain all of said pistons normally submerged in vacuum, and an operator operated part connected with said valve mechanism.

28. In automotive vehicles provided with an internal combustion engine, having a suction passage and brake mechanisms, the combination with a plurality of actuators each comprising a cylinder closed at both ends, a piston in said cylinder, and means for connecting the piston with certain of said brake mechanisms, of a single, longitudinally movable, controlling valve mechanism for all of said actuators operatively connected with at least one of said pistons, and movable therein, a single operator operated part for controlling said valve mechanism means for connecting all of the actuator cylinders simultaneously with the suction passage of the engine and with the atmosphere on opposite sides of each piston under the control of said valve mechanism, means for normally connecting each cylinder on both sides of the piston therein with said suction passage when the piston and brake mechanism connected therewith are in retracted or off position, to maintain all of said pistons normally submerged in vacuum, said valve mechanism comprising parts movable longitudinally relatively with respect to each other and connected respectively with the operator operated part, and brake mechanism connected with at least one of said pistons.

29. In automotive vehicles provided with an internal combustion engine, having a suction passage and brake mechanisms, the combination with a plurality of actuators each comprising a cylinder closed at both ends, a piston in said cylinder, and means for connecting the piston with certain of said brake mechanisms, of a single, longitudinally movable, controlling valve mechanism for all of said actuators operatively connected with at least one of said pistons, and movable therein, means for connecting all of the actuator cylinders simultaneously with the suction passage of the engine and with the atmosphere on opposite sides of each piston under the control of said valve mechanism, said valve mechanism being constructed to connect all of the cylinders on both sides of the pistons therein with the suction passage when said pistons and the brake mechanisms connected therewith are in the retracted or off position, an operator operated part, said valve mechanism comprising parts movable longitudinally with respect to each other and connected respectively with the operator operated part, and brake mechanism connected with at least one of said pistons.

30. Brake operating mechanism comprising, in combination, a plurality of separate power actuators and brake mechanisms connected thereto, a manually operated brake applying mechanism and a device controlling the power mechanism and which is interposed in the manually operated mechanism and which is operated by force applied thereto and through which the brake applying force is transmitted when certain brakes are applied manually.

31. Brake operating mechanism comprising, in combination, a plurality of separate power actuators and brake mechanisms connected thereto, a manually operated brake applying mechanism connected to certain of the brakes and a valve device controlling the fluid power mechanisms and which is interposed in the manually operated mechanism and which is operated by force applied thereto and through which the brake applying force is transmitted when certain brakes are applied manually.

32. Brake applying mechanisms comprising, in combination, a plurality of power actuators, an operator operated part, a connection therefrom to certain of the brake mechanisms, and means interposed in the connection and serving to control the power to all of said actuators and constituting a tension element in said connection when certain brakes are applied manually.

33. Brake mechanism comprising, in combination, a plurality of braking devices, separate actuators for said devices, an operator operated part, connections from said operator operated part to certain of said brake devices less than all of them, and means interposed in said connections and serving when the operator operated part is actuated to control the power to all of said power actuators, said means acting as a tension element in said connections.

34. Brake mechanism comprising, in combination, a plurality of braking devices, separate power actuators for said devices, an operator operated part, a connection from said operator operated part to certain of said brake devices, and valve mechanism included in said connection for controlling the power to all of said actuators, said valve mechanism acting as a tension element in the connection.

35. Brake mechanism for vehicles comprising, in combination, braking devices for steering and non-steering wheels, separate power actuators for said brake devices, an operator operated part, connections from said operator operated part to certain of the brake devices for non-steering wheels, and means arranged in the connections for controlling the power to all of said actuators, said means being operated by force applied to said operator operated part and through which the brake applying force is transmitted when the brakes of the aforesaid non-steering wheels are applied manually.

36. Brake applying mechanism for vehicles, comprising, in combination, braking devices for steering and non-steering wheels, separate power actuators for said devices, an operator operated part, valve mechanism for controlling the power to all of said actuators, and connections from said operator operated part through said valve mechanism to certain of the braking devices, said valve mechanism forming a tension element in said connections.

37. In combination, an automotive vehicle, braking devices for steering and non-steering wheels thereof, separate actuators for said devices, an operator operated part, valve mechanism for controlling fluid power to all of said actuators, and connections from said operator operated part to at least one non-steering wheel brake device, said valve mechanism forming a part of said connections and being controlled by the operator operated part.

38. In combination, an automotive vehicle, braking devices for steering and non-steering wheels thereof, separate actuators for said devices, an operator operated part, valve mechanism for controlling fluid power to all of said actuators, and connections from said operator operated part through said valve mechanism to a non-steering wheel brake device, said valve mechanism forming a part of said connections and being controlled by the operator operated part.

39. Brake mechanism comprising in combination, a plurality of power brakes, mechanical connections for operating certain of said brakes independently of the power, and valve mechanism controlling the power brakes and forming a tension element in said connections and arranged to operate certain of the brakes when tension is applied to said connections.

40. Braking mechanism comprising in combination, a plurality of braking units, fluid power means for operating said braking units, separate manually operated connections for operating certain of said units, and controlling valve mechanism for the fluid power means forming a force transmitting element in said connections and operated by the application of force to said connections.

In testimony whereof we affix our signatures.

CALEB S. BRAGG.
VICTOR W. KLIESRATH.